United States Patent Office 3,166,606
Patented Jan. 19, 1965

3,166,606
POLYCARBONATE RESINS HAVING IMPROVED FLOW PROPERTIES
Norman H. Reinking, Millington, and John Wynstra, Berkeley Heights, N.J., assignors to Union Carbide Corporation, a corporation of New York
No Drawing. Filed Dec. 28, 1960, Ser. No. 78,821
6 Claims. (Cl. 260—860)

The present invention relates in general to polycarbonate resins. More particularly it relates to modified polycarbonate resins having improved pressure sensitivity.

In conventional melt forming operations such as injection molding and extrusion, the flow characteristics of synthetic thermoplastics is a signally important factor to be considered. In general the more pressure sensitive the resin, i.e., the greater the departure of its flow properties from classical Newtonian flow behavior, the more rapid and controllable the melt forming operation at any given melt viscosity.

As produced by conventional methods, bisphenol polycarbonate homopolymers and carbonate copolyesters, and particularly those derived from 2,2-bis-(4-hydroxyphenyl)-propane, possess high melt viscosity values in combination with a flow behavior closely approaching Newtonian. As a consequence, the working pressure requirements in such operations as injection molding are quite high without the increased flow rate advantage attainable with most thermoplastic polymers.

It is therefore a general object of this invention to provide a more pressure sensitive polycarbonate resin.

It is also a general object to provide a method for the preparation of these improved polycarbonate resins.

These as well as other and more particular objects which will become apparent from the disclosure herein-after set forth are achieved by polycarbonate resin compositions in which the total polycarbonate content is a blend of from 10 to 90 percent by weight based on the total polymer content of a high molecular weight polycarbonate mass having a reduced viscosity value of at least 0.6 with a complementary amount of from 90 to 10 percent by weight based on the total polymer content of a low molecular weight polycarbonate mass having a reduced viscosity value of not greater than 0.5, with the provisos that the difference in reduced viscosity values of the two polymer masses be not less than 0.2 and the resultant polycarbonate blend have a reduced viscosity value within the range of about 0.4 to about 0.8.

The term "reduced viscosity" as used throughout the specification and in the appended claims is defined by the following relationship:

$$\text{Reduced viscosity} = \frac{(t_s - t_o)}{Ct_o}$$

where $t_o$ is the efflux time in seconds for methylene chloride determined on a 3-ml. sample in an Ostwalt viscometer at 25° C. $t_s$ is the efflux time in seconds for a solution of the polycarbonate in methylene chloride at an approximate concentration of 0.2 gm. per 100 ml. of solution, in the same viscometer at 25° C. C. is the exact concentration of the polycarbonate in terms of grams of polycarbonate per 100 ml. of solution.

As is well understood in the art, the viscosity of a resin solution bears a direct relationship to the weight average molecular size of the polymer chains, and is the most important single property that can be used to characterize the degree of polymerization. The reduced viscosity limitations assigned to the polymer masses of the present invention are therefore to be understood as significant in reflecting molecular size rather than considerations concerning the viscosity per se. It will further be obvious that reduced viscosity values used herein are of significance only relative to each other rather than in any absolute sense, and for this reason other polycarbonate-solvent systems can be employed without departing from the proper scope of the invention. When solvents other than methylene chloride are employed the required average molecular size relationships can readily be established by reference to the reduced viscosity values defined herein for methylene chloride solutions even though the numerical reduced viscosity values of the alternative system selected may be different.

The increased pressure sensitivity of the polycarbonate blends of the present invention is conveniently particularized in terms of their "flow ratio." By the term "flow ratio" as used throughout the specification and claims is meant the ratio of the rate of flow in terms of mass per unit of time of a given blend sample at 260° C. through a restricting orifice effected by a five-fold increase from 44 p.s.i. to 220 p.s.i. of the pressure applied to force the blend through the orifice. A suitable apparatus for determining the flow ratio of a polymer is described in ASTM standard test method D–1238–7 T. Within the terms of this test method a flow ratio value of 5 indicates substantially Newtonian flow characteristics and correspondingly inadequate pressure sensitivity. It has been found that polycarbonate resins as directly produced by conventional polymerization reactions, particularly direct phosgenation, possess flow ratio values which are not more than about 5.6 and as a rule are substantially less. Experience has taught, however, that in many fabrication operations involving melt processes, a flow ratio value of about 5.6 represents a threshold factor which determines the success or failure of the forming operation. For example, in attempting to form a complicated irregular article by injection molding near the decomposition temperature of a polycarbonate resin, a flow ratio value of 5.6 may be insufficient to achieve a commercially suitable molded piece, but an increase in the flow ratio value to only 5.8 may render the operation entirely suitable. Thus, in many operations the difference in flow ratio of only about 0.2 constitutes a difference in kind rather than in degree. The flow ratio of the polycarbonate composition of the present invention is, as a minimum value, about 5.8. Values as high as 8.3 are readily attainable. Generally the flow ratio values for the blends of the present invention are well above 6.0, and are preferred.

The polymer blends of this invention must meet four separate requirements, namely, (a) at least 10% by weight of the polycarbonate resin material present must be a polycarbonate resin having a reduced viscosity less than 0.5, (b) at least 10% by weight of the polycarbonate resin material present must be a polycarbonate resin having a reduced viscosity value of at least 0.6, (c) the difference in reduced viscosity value of the two resin masses must be at least 0.2, and (d) the reduced viscosity of the final polycarbonate blend must be between about 0.4 and 0.8. It will, of course, be obvious to those skilled in the art that an exact relationship of all four requirements cannot be set forth in a single expression, primarily because reduced viscosity values represent an arbitrary characterization of the complex molecular composition of any given polymer mass. It is to be understood, therefore, by those desiring to practice the present invention using an extreme parameter within the bounds defined by requirements (a) or (b) above, slight departures from the limits expressed for (a) or (b) may be necessary to realize the limitations expressed in requirement (c) and/or (d) above. Such departures are, however, easily determined by simple routine investigation and are not intended to limit in any manner the proper scope of the invention.

The preferred blends can be set forth with more exactness. These blends comprise, as the total polycarbonate resin content, from 60 to 80 percent by weight of a polycarbonate resin having a reduced viscosity value of from about 0.3 to 0.5 and a complementary amount of from 40 to 20 percent by weight of a polycarbonate resin having a reduced viscosity value of from about 0.7 to 1.1.

The substantially linear polycarbonate resins which are suitably employed in the practice of the present invention are any of the substantially linear polycarbonate homopolymers, copolymers, and copolyesters well known in the art. Detailed descriptions of the polymers and the processes of producing them initially are contained in Angew. Chem., 68, No. 20, pp. 633–640 (1956), H. Schnell; Ind. Eng. Chem., 51, No. 2, pp. 157–160 (1959), H. Schnell; British Patent 772,627, issued April 17, 1957, to Farbenfabriken Bayer A.G. as assignee; French Patent 1,215,629 issued to General Electric Company, U.S.A., as assignee; and Canadian Patent 578,585. In general, polycarbonate homopolymers and copolymers are produced either by direct phosgenation of a bisphenol or mixture of bisphenols in the presence of an acid binding agent or by ester interchange reaction between a bisphenol or mixture of bisphenols and a carbonate precursor such as diphenyl carbonate. Copolyesters are prepared by employing, usually in minor proportion with respect to the bisphenol, a monohydroxy monocarboxylic acid, a dicarboxylic acid, or suitable derivatives thereof such as phthaloyl chloride.

The well known polycarbonate homopolymers and copolymers which can suitably be employed in this invention are those comprising recurring carbonate groups

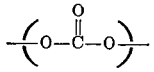

linking the residues of one or more species of dihydric phenols and especially bisphenols. By residue is meant the divalent radical formed by schematically splitting off both hydroxyl groups from a dihydric phenol conforming to the general formula:

(I)    HO—Ar—$Q_n$—Ar—OH in which Ar in each occurrence represents a divalent aromatic radical, preferably phenylene, but also can be polynuclear, such as biphenylene, a fused ring structure having an aromatic character such as naphthylene, anthrylene, and the like, or mixed polynuclear aromatic radicals such as

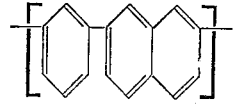

Q in each occurrence can be an alkylene or alkylidene radical such as methylene, ethylene, propylene, propylidene, isopropylidine, butylene, butylidene, isobutylidene, amylene, isoamylene, amylidene, isoamylidene, and the like; a cycloaliphatic radical such as cyclopentyl and cyclohexyl; a divalent radical formed from two or more alkylene or alkylidene groups connected by a nonalkylene or nonalkylidene group such as an aromatic linkage, a cycloaliphatic linkage, a tertiary amino linkage, an ether linkage, a thioether linkage, a carbonyl linkage, a sulfur-containing linkage such as sulfoxide or sulfone; an ether linkage, a carbonyl group, or a silicon-containing group; n can be either zero or one.

Both Ar and Q in the above general formula can contain non-reactive substituent groups such as methyl, ethyl, propyl, phenyl, naphthyl, benzyl, ethylphenyl, cyclopentyl, cyclohexyl, and the oxy derivatives thereof; inorganic radicals such as chlorine, bromine, fluorine, nitro and the like.

Specifically illustrative of the dihydric phenols that may be employed in forming the polycarbonates suitably employed in this invention, but in no way limitative thereof, are 2,2-bis-(4-hydroxyphenyl)-propane (bisphenol-A); 2,4'-dihydroxydiphenylmethane; bis-(2-hydroxyphenyl)-methane; bis-(4-hydroxyphenyl)-methane; bis-(4-hydroxy-5-nitrophenyl)-methane; bis-(4 - hydroxy-2,6-dimethyl-3-methoxyphenyl)-methane; 1,1 - bis-(4 - hydroxyphenyl)-ethane; 1,2-bis-(4-hydroxyphenyl)-ethane; 1,1-bis-(4-hydroxy-2-chlorophenyl)-ethane; 1(p-hydroxyphenyl)-1-(4-[p-hydroxyphenyl]-cyclohexyl)-ethane; 1,1 - bis-(2,5-dimethyl-4-hydroxyphenyl)-ethane; 1,3-bis-(3-methyl-4-hydroxyphenyl)-propane; 2,2-bis-(3-phenyl-4-hydroxyphenyl)-propane; 2,2 - bis-(3-isopropyl-4-hydroxyphenyl)-propane; 2,2-bis-(4-hydroxynaphthyl)-propane; 2,2-bis-(4-hydroxyphenyl)-pentane; 3,3 - bis-(4-hydroxyphenyl)-pentane; 2,2-bis-(4-hydroxyphenyl)-heptane; bis-(4-hydroxyphenyl)-phenylmethane; bis-(4-hydroxyphenyl)-cyclohexylmethane; 1,2 -bis-(4-hydroxyphenyl)-1,2-bis-(phenyl)-propane; 2,2-bis-(4-hydroxyphenyl)-1-phenylpropane; and the like. Also included are dihydroxybenzenes typified by hydroquinone and resorcinol, dihydroxydiphenyls such as 4,4'-dihydroxydiphenyl; 2,2'-dihydroxydiphenyl; 2,4'-dihydroxydiphenyl; dihydroxynaphthalenes such as 2,6-dihydroxynaphthalene, and the like, bis-(4-hydroxyphenyl)-sulfone; 2,4'-dihydroxydiphenyl sulfone; 5-chloro-2,4'-dihydroxydiphenyl sulfone; 3'-chloro-2,4'-dihydroxydiphenyl sulfone; 3'-chloro-4,4'-dihydroxydiphenyl sulfone; 4,4'-dihydroxytriphenyl disulfone, etc.; 4,4'-dihydroxydiphenyl ether; 4,4'-dihydroxytriphenyl ether; the 4,3'-, 4,2'-, 4,1'-, 2,2'-, 2,3'- etc. dihydroxydiphenyl ethers; 4,4'-dihydroxy-2,6'-dimethyldiphenyl ether; 4,4'-dihydroxy-2,5-dimethyldiphenyl ether; 4,4'-dihydroxy-3,3'-diisobutyldiphenyl ether; 4,4'-dihydroxy - 3,3'-diisopropyldiphenyl ether; 4,4'-dihydroxy-3,2'-dinitrodiphenyl ether; 4,4'-dihydroxy-3,3'-dichlorodiphenyl ether; 4,4'-dihydroxy-3,3'-difluorodiphenyl ether; 4,4'-dihydroxy-2,3'-dibromodiphenyl ether; 4,4'-dihydroxydinaphthyl ether; 4,4'-dihydroxy-3,3'-dichlorodinaphthyl ether; 2,4'-dihydroxytetraphenyl ether; 4,4'-dihydroxypentaphenyl ether; 4,4'-dihydroxy-2,6-dimethoxydiphenyl ether; 4,4'-dihydroxy-2,5-diethoxy-diphenyl ether, etc. Mixtures of the dihydric phenols can also be employed and where dihydric phenol is mentioned herein, mixtures of such materials are considered to be included.

The copolyesters suitably employed are also well known and include polymers comprising at least two of the following four recurring units

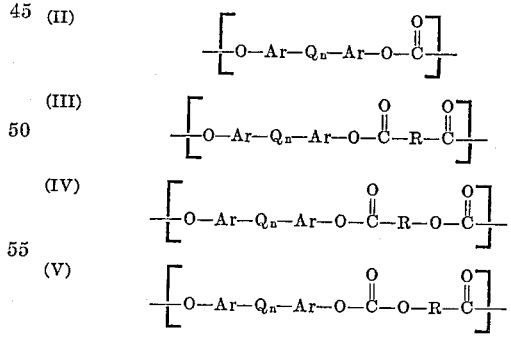

wherein Ar, Q, and $n$ have the same meaning as in the general Formula I above, and wherein R is the residue of a carboxylic acid conforming to the general formula (VI)

wherein D is either a hydroxyl or carboxyl group and R is an alkylene or alkylidene group such as methylene, ethylene, propylene, propylidene, isopropylidene, butylidene, butylene, isobutylidene, amylene, isoamylene, amylidene isoamylidene; a cycloaliphatic group such as cyclopentylene, or cyclohexylene; a divalent hydrocarbon group containing olefinic unsaturation; a divalent aromatic radical such as phenylene, naphthylene, biphenylene, substituted phenylene, etc.; two or more aromatic groups connected through non-aromatic linkages such as those defined by Q in Formula I; an aralkyl radical such as tolylene, xylyene, etc.

Carboxylic acids which can be employed in the preparation of copolyesters and which provide the residue R appearing in Formulae II, III, IV, and V are the saturated, aliphatic dibasic acids derived from straight chain paraffin hydrocarbons, such as, malonic, dimethyl malonic, succinic, glutaric, adipic, pimelic, suberic, azelaic and sebacic acid, the halogen-substituted aliphatic dibasic acids, aliphatic carboxylic acids containing hetero atoms in their aliphatic chain, such as thio-diglycollic or diglycollic acid, unsaturated acids as maleic or fumaric, aromatic and aliphatic-aromatic dicarboxylic acids, such as phthalic, isophthalic, terephthalic, homophthalic, o-, m-, and p-phenylenediacetic acid; the polynuclear aromatic acids such as diphenic acid, and 1,4 naphthalic acid;

Hydroxy acids such as hydroxybutyric acid, glycollic acid, latic acid, mandelic acid, p-, m- and o-hydroxy benzoic acid, and hydroxy-substituted long-chain fatty acids, such as 12-hydroxystearic acid.

The preferred polycarbonates for use in forming the novel blends of the present invention are the homopolymers and copolymers formed from bisphenols having the general formula (VII)

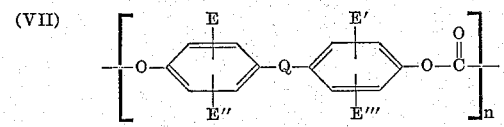

wherein Q is phenylene, oxygen, —$SO_2$—, alkylene, or alkylidene and E, E', E'', and E''' is hydrogen, chlorine, alkyl containing from 1–4 carbon atoms or oxyalkyl containing from 1–4 carbon atoms. It is particularly preferred that Q represent an alkylidene group containing from 1–6 carbon atoms.

Preferred copolyesters are those formed from the bisphenols of Formula VII and an aromatic dicarboxylic acid free of ring substituents, such as isophthalic acid, in which the recurring units derived from the aromatic dicarboxylic acid are present in an amount of from about 5 to about 20%.

The aforesaid polycarbonates regardless of the method of preparation exhibit vastly improved pressure sensitivity when combined to form the novel blends of this invention. In general, however, more remarkable results are achieved using polycarbonates prepared by direct phosgenation methods.

The following examples are provided in order that the practice of this invention can be better understood. The examples are illustrative only, and are not intended to be in any way limitative. Unless otherwise specified reduced viscosity values are given for a solution of 0.2 gram of the polymer mass in 100 ml. of methylene chloride solution at 25° C., melt flow values are expressed in decigrams per minute at 260° C. under the pressure indicated.

EXAMPLE 1

*Preparation of a high molecular weight polycarbonate homopolymer*

To a two liter glass reactor equipped with a sealed stirrer, thermometer, gas inlet, reflux condenser, pH electrodes, and a dropping funnel was charged:

|  | Gms. |
|---|---|
| 2,2-bis-(4-hydroxphenyl)propane (Bisphenol A) | 125 |
| p-Phenyl phenol | 2.83 |
| Methylene chloride | 550 |
| Sodium hydrosulfite | 0.11 |
| Triethylamine | 1.67 |
| Aqueous sodium hydroxide solution (8.8% NaOH) | 230 |

An additional 418 gms. of sodium hydroxide solution (8.8% by weight NaOH) were placed in the dropping funnel. Phosgene gas (70 gms.) was bubbled into the reaction over a period of one hour and forty minutes at 25° C.±2° C. Concurrently, the sodium hydroxide in the dropping funnel was added so as to maintain a pH of 10.5–11.2. After all the sodium hydroxide had been added, phosgenation was continued to a pH of 7. The reaction mass was then stirred for ten minutes with 25 gms. of NaOH dissolved in 50 gms. of water. The agitator was stopped and the two layers were allowed to separate. The aqueous layer was decanted off (no unreacted bisphenol was found on acidification of this portion), and the solvent-polymer solution was then acidified with 14 ml. concentrated HCl and 12.5 ml. of glacial acetic acid in 200 ml. of water and agitated for 1½ hours at 25° C. After additional water washes, the polymer was isolated by coagulation in isopropanol, recovered and dried in vacuum oven at 110° C. for 48 hours. The dried polymer had a reduced viscosity (0.2 g. sample in 100 ml. methylene chloride solution at 25° C.) of 0.63. It showed a melt flow at 260° C. of 2.26 decigrams/minute at 44 p.s.i. and 12.4 decigrams/minute at 220 p.s.i. The calculated flow ratio, therefore, was 5.45.

EXAMPLE 2

*Preparation of low molecular weight polycarbonate homopolymers*

The procedure described in Example 1 was repeated twice using the same apparatus and formulation except that the quantity of p-phenylphenol employed was 5.25 grams and 3.15 grams respectively. The resultant polymers were found to have reduced viscosity values of 0.41 and 0.5 respectively. The flow ratio of the polymers was found to be 5.60 and 5.58 respectively.

EXAMPLE 3

*Preparation of low molecular weight polycarbonate homopolymer by ester interchange*

To a three liter glass reactor equipped with a stirrer, thermometer, and Vigreux column was charged:

|  | Gms. |
|---|---|
| 2,2-bis-(4-hydroxyphenyl)propane (Bisphenol A) | 684 |
| Diphenyl carbonate | 675 |
| Lithium hydroxide in phenol (0.5% LiOH·$H_2O$) | 0.3 |

This reaction was heated and by-product phenol distilled off over a period of 3½ hours. The temperature and pressure at the start were 120° C./40 min. These conditions were gradually made more severe until a final temperature of 248° C. at 10 mm. was obtained. The reduced viscosity of the product was 0.20 (0.2 g. in 100 ml. solution in $CH_2Cl_2$ at 25° C.).

EXAMPLE 4

(A) *High molecular weight Bisphenol-A-isophthalate-carbonate copolyester (10% isophthalate)*

To a two liter closed glass reactor provided with a sealed stirrer, pH meter electrodes, thermometer, a reflux condenser, and three inlet tubes, were charged 125.0 grams (0.55 mole) of 2,2-bis-(4-hydroxyphenyl)propane, 0.11 gram of sodium hydrosulfite (antioxidant), 2.12 grams of p-phenylphenol, and 181 grams of water. To this mixture, 11.0 grams of sodium hydroxide dissolved in 330 grams of water (25 percent of the stoichiometric amount of sodium hydroxide) were added slowly with constant stirring. The temperature of the system was established at about 25° C. and 530 grams of methylene chloride and 1.67 grams of triethylamine were added. At this point the pH of the mixture was 11.2. With continued vigorous stirring phosgene gas was bubbled into the reactor, and simultaneously the dropwise addition of solutions containing 46.2 grams (1.16 moles, 105 percent of the stoichiometric amount) of sodium hydroxide in 80 grams of water and 11.15 grams (0.055 mole) of isophaloyl chloride in 30 grams of methylene chloride was begun. Phosgene was added at a rate of approximately one gram per minute. The isophthaloyl chloride-methylene chloride solution was also added at a rate of approximately one gram per minute. The sodium hydroxide solution was added at such a rate so that the pH of the reaction mixture was maintained within the range of 10.8 to 11.3. After the addition of the sodium hydroxide solution was complete, phosgene addition was continued until the pH of the reaction mass had dropped to 7.0. At this point, 30 grams of sodium hydroxide dissolved in 60 grams of water were added and the resulting mixture stirred for 10 minutes. Throughout the entire phosgenation reaction period of 1 hour, 11 min., the temperature of the system was maintained at 25° C.±3. Upon settling, an aqueous layer developed which was drawn off. The polymer solution was washed several times with water and then neutralized with a mixture of dilute (ca. 4 percent) hydrochloric and acetic acids. Washing was continued until the aqueous extracts tested negative for chloride ion with silver nitrate. The polymer was then coagulated by vigorous stirring with about 1,200 ml. of isopropanol, filtered and dried. The final copolyester resin had a reduced viscosity (0.2 gram polymer/100 ml. methylene chloride at 25° C.) of 0.80. Flow ratio, 5.50.

(B) *Bisphenol-A-carbonate diphenate copolyester*

The procedure given in Example 4(A) was repeated using 15.35 grams (0.055 mole) diphenoyl chloride

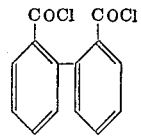

dissolved in 40 ml. methylene chloride solution in place of the isophthaloyl chloride solution. The isolated polymer had a reduced viscosity of 0.48. Flow ratio 5.45.

EXAMPLE 5

Using the procedure and apparatus substantially as described in Example 1 and using the same formulation except that the p-phenylphenol concentration was varied in order to vary the average molecular weight of the polymers, a series of polycarbonate homopolymers were prepared. The melt flow ratio of each polymer was determined. Results appear in Table I.

TABLE I

| Run | Reduced Viscosity | Melt Flow @ 260° C. | | Flow Ratio |
|---|---|---|---|---|
| | | 44 p.s.i. | 220 p.s.i. | |
| A | 0.58 | 3.3 | 18.1 | 5.55 |
| B | 0.57 | 3.45 | 18.8 | 5.45 |
| C | 0.76 | 1.16 | 6.48 | 5.56 |
| D | 0.76 | 1.08 | 5.82 | 5.39 |
| E | 0.72 | 0.98 | 5.46 | 5.56 |
| F | 0.92 | 0.26 | 1.43 | 5.50 |
| G | 1.37 | 0.042 | 0.23 | 5.40 |

EXAMPLES 6-15

To illustrate the improvement in flow ratio, and hence pressure sensitivity, achieved by blends of polymer masses of different reduced viscosity values in accordance with the present invention, samples of five polymers prepared in the foregoing examples were blended in various proportions and tested in accordance with ASTM test D-1238-57 T for melt flow properties. The flow ratio was thereafter calculated. The blends were prepared by dissolving the various proportions in sufficient methylene chloride to give solutions containing from about 10-15 percent by weight solids content. The methylene chloride was thereafter removed by heating under reduced pressure and the polymer blend isolated. The results are set forth in Table II below.

TABLE II

| Example | Composition by Weight Percent and R.V. of Components | | | | | | R.V. of Composition | Melt Flow at 260° C. (decigram/min.) | | Flow Ratio |
|---|---|---|---|---|---|---|---|---|---|---|
| | 0.2a | 0.41b | 0.5b | 0.72c | 0.92c | 1.37c | | 44 p.s.i. | 220 p.s.i. | |
| | 100 | | | | | | | | | 5.60 |
| | | 100 | | | | | | | | 5.58 |
| | | | 100 | | | | | | | 5.56 |
| | | | | 100 | | | | | | 5.50 |
| | | | | | 100 | | | | | 5.40 |
| | | | | | | 100 | | | | |
| 6 | | 65 | | | 35 | | 0.59 | 2.94 | 20.5 | 7.0 |
| 7 | | 70 | | | 30 | | 0.56 | 4.1 | 26.7 | 6.56 |
| 8 | | 51 | | 49 | | | 0.56 | 3.67 | 22.66 | 6.2 |
| 9 | | 70 | | | | 30 | 0.70 | 1.37 | 10.05 | 7.4 |
| 10 | | 75 | | | | 25 | 0.65 | 2.03 | 16.83 | 8.25 |
| 11 | | 50 | | | 25 | 25 | 0.78 | 0.72 | 4.75 | 6.6 |
| 12 | | | 60 | 40 | | | 0.59 | 2.35 | 14.5 | 6.18 |
| 13 | | | 90 | | | 10 | 0.58 | 3.06 | 18.28 | 5.96 |
| 14 | 30 | | 30 | | 40 | | 0.59 | 2.1 | 17.56 | 8.3 |
| 15 | | | | | | | 0.53 | 2.78 | 16.72 | 6.0 | a = polymer of Example 3.   b = polymer of Example 2.   c = polymer of Example 5.

EXAMPLE 16

A quantity of blend was prepared from a polycarbonate homopolymer of 2,2-bis-(4-hydroxyphenyl)propane prepared in essentially the same manner as Example 1, except that the amount of terminator was varied in order to prepare polymers of R.V. 0.37 and R.V. 1.13. These materials were solution blended ($CH_2Cl_2$) in the following proportions and then isolated by evaporation of solvent in a heated twin screw vacuum mill.

| | Percent |
|---|---|
| R.V. 0.37 | 78.4 |
| R.V. 1.13 | 21.6 |

The resultant blend had a reduced viscosity of 0.53 a melt flow at 260° C. and 44 p.s.i. of 2.15 decigrams per minute and at 260° C. and 220 p.s.i. of 17.0 decigrams per minute. The calculated flow ratio, therefore, was 7.9.

EXAMPLE 17

A similar blend was prepared using polycarbonate homopolymer prepared as in Example 1 with sufficient terminator to give reduced viscosities of 0.37 and 0.9.

| | Percent |
|---|---|
| R.V. 0.37 | 80 |
| R.V. 0.90 | 20 |

The resultant blend had a reduced viscosity of 0.48 and a melt flow at 260° C. and 44 p.s.i. of 3.6 decigrams per minute and a flow of 25.5 decigrams per minute at 260° C. and 220 p.s.i. The calculated flow ratio, therefore, was 7.1.

Material prepared in Example 17 was injection molded in an H-200 Van Dorn injection molding apparatus equipped with a one-ounce cylinder and a mold for preparing a set of ½" x 5" x ⅛" flexural and tensile test bars. Operating at a pressure of 16,800 p.s.i., a cycle of 60 seconds and a mold temperature of 190° F., the cylinder temperature was varied until a temperature was found below which perfect molded specimens could not be formed. In other words, a minimum cylinder temperature for sustained molding operation was determined.

For the blend in Example 17, the minimum cylinder temperature proved to be 508° F. For a normally prepared polymer of similar melt flow, as for example, Run B of Example 5, the minimum cylinder temperature under the same operating conditions was found to be 560° F. Thus, the pressure sensitive material could be molded at approximately 50° F. below the normally prepared polymer. It will be obvious to those skilled in the art that this improved flow behavior provides, at equivalent molding temperature, greater productivity and shorter molding cycles. In addition, because of the improved flow behavior more complex and difficultly molded objects can be fabricated.

From the preceding examples it will be obvious that high and low molecular weight polycarbonate resins can readily be prepared according to the same general method by varying the quality of chain-growth terminator employed.

In forming the novel blended polycarbonate compositions of the present invention, it is not essential that only two different polymer batches be blended to achieve the desired results. Each of the two polymer masses ultimately blended can in turn be blends of two or more polymer batches of differing reduced viscosity values so long as the net result is a polymer mass having a reduced viscosity not greater than 0.5 and a polymer mass having a reduced viscosity greater than 0.6, with the provisos that these two polymer masses have reduced viscosity values differing by not less than about 0.2, and the final polymer blend has a reduced viscosity value of from about 0.4 to about 0.8. If compatible, different polymer species can be used.

The novel polycarbonate resin blends of this invention can be prepared by any of the procedures ordinarily used to mix or compound other conventional polymeric masses. For example, the two or more resin batches can be mixed or blended together in a ribbon blendor, a differential-speed roll mill, a Hobart mixer, a paddle blender, or the like. When hot processing techniques are employed, it is advantageous to conduct at least a portion of the mixing at temperatures high enough, e.g., above about 230° C., to flux the resin mass in order to achieve the maximum of uniformity of product. Because of the relatively high temperatures required to flux polycarbonate resins, it is preferred to blend the resin batches in solution in an inert solvent such as, methylene chloride, chloroform, dioxane, tetrahydrofuran, chlorobenzene, and the like, and thereafter remove the solvent.

The blends of this invention can also include antioxidants, fillers, stabilizers, colorants and the like. The novel blends, because of their similarity to conventional polycarbonate resins in all physical properties except pressure sensitivity, are eminently suitable for the fabrication of molded and extruded articles such as containers, closures, electrical insulating tapes, extruded tubing, extruded sheet, and the like.

What is claimed is:

1. A polycarbonate resin composition possessing improved extrudability which comprises a blend of from 10 to 90 percent by weight based on the total polycarbonate resin content of a high molecular weight polycarbonate resin comprising recurring carbonate groups linking residues of at least one dihydric phenol having a reduced viscosity value of at least 0.6 and a complementary amount of from 90 to 10 percent by weight based on the weight of the total resin content of a low molecular weight polycarbonate comprising recurring carbonate groups linking residues of at least one dihydric phenol having a reduced viscosity value of not greater than 0.5 with the proviso that the difference in reduced viscosity values of the two resin masses be not less than about 0.2, and with the further proviso that the said blend has a reduced viscosity value within the range of about 0.4 to about 0.8.

2. A polycarbonate resin composition possessing improved extrudability which comprises a blend of from 20 to 40 percent by weight based on the total polycarbonate resin content of a high molecular weight polycarbonate resin comprising recurring carbonate groups linking residues of at least one dihydric phenol having a reduced viscosity value of from about 0.7 to 1.1 and a complementary amount of from 80 to 60 percent by weight based on the weight of the total resin content of a low molecular weight polycarbonate comprising recurring carbonate groups linking residues of at least one dihydric phenol having a reduced viscosity value of from about 0.3 to 0.5.

3. The polycarbonate resin composition according to claim 2 wherein the blended polymer masses comprise a substantially linear polycarbonate having the repeating unit

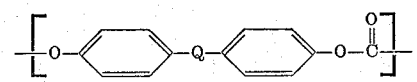

wherein Q is an alkylidene group having from 1 to 6 carbon atoms.

4. The polycarbonate resin composition according to claim 2 in which the blended polymer masses comprise the substantially linear polycarbonate having the repeating unit

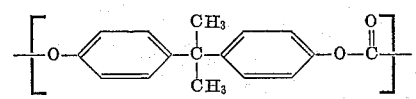

5. The polycarbonate resin composition according to claim 2 in which the blended polymer masses comprise the substantially linear copolyester having the repeating unit

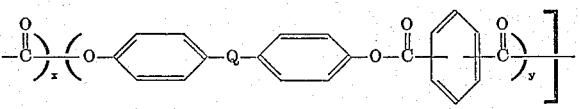

wherein Q is an alkylidene group having from 1 to 6 carbon atoms, and the ratio of $x$ to $y$ is at least about 4:1.

6. A polycarbonate resin composition possessing improved extrudability which comprises a blend of from 20 to 40 percent by weight based on the total polycarbonate resin content of a 2,2-bis-(4-hydroxyphenyl)propane carbonate homopolymer having a reduced viscosity value of from about 0.7 to 1.1 and a complementary amount of from 80 to 60 percent by weight based on the weight of the total resin content of a 2,2-bis-(4-hydroxyphenyl)propane carbonate homopolymer having a reduced viscosity value of from about 0.3 to about 0.5.

References Cited in the file of this patent

UNITED STATES PATENTS 2,789,965    Reynolds et al. _____ Apr. 23, 1957
2,789,971    Reynolds et al. _____ Apr. 23, 1957